United States Patent
TeGrotenhuis et al.

(10) Patent No.: US 9,289,741 B2
(45) Date of Patent: Mar. 22, 2016

(54) SUSPENDED-SLURRY REACTOR

(71) Applicants: Ward E. TeGrotenhuis, Kennewick, WA (US); Karim M. Ayman, Richland, WA (US); Paul H. Humble, Kennewick, WA (US); Yong Wang, Richland, WA (US)

(72) Inventors: Ward E. TeGrotenhuis, Kennewick, WA (US); Karim M. Ayman, Richland, WA (US); Paul H. Humble, Kennewick, WA (US); Yong Wang, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 441 days.

(21) Appl. No.: 13/753,714

(22) Filed: Jan. 30, 2013

(65) Prior Publication Data

US 2013/0197109 A1 Aug. 1, 2013

Related U.S. Application Data

(60) Provisional application No. 61/593,486, filed on Feb. 1, 2012.

(51) Int. Cl.
*B01J 8/02* (2006.01)
*C01B 3/26* (2006.01)
(Continued)

(52) U.S. Cl.
CPC .. *B01J 8/02* (2013.01); *B01J 8/009* (2013.01); *B01J 10/007* (2013.01); *B01J 19/0053* (2013.01); *B01J 19/0093* (2013.01); *B01J 19/249* (2013.01); *B01J 19/2475* (2013.01); *B01J 23/42* (2013.01); *B01J 23/44* (2013.01); *B01J 35/002* (2013.01); *B01J 35/023* (2013.01); *C01B 3/26* (2013.01); *C10G 2/00* (2013.01); *C10G 2/342* (2013.01); *C01B 2203/0277* (2013.01); *C01B 2203/1064* (2013.01); *C01B 2203/1082* (2013.01)

(58) Field of Classification Search
CPC .............. B01J 8/02; B01J 8/009; B01J 7/00; B01J 7/02; C01B 3/0015; C01B 3/26
See application file for complete search history.

(56) References Cited

U.S. PATENT DOCUMENTS 5,849,235 A * 12/1998 Sassa et al. ............... 264/288.8
6,666,909 B1 * 12/2003 TeGrotenhuis et al. ......... 95/273
(Continued)

FOREIGN PATENT DOCUMENTS

CA 2206626 11/1998
GB 2059793 A 4/1981
(Continued)

OTHER PUBLICATIONS

International Search Report/Written Opinion for International Application No. PCT/US2013/023986, International filing date Jan. 31, 2013, Date of mailing Apr. 11, 2013.
(Continued)

*Primary Examiner* — Lessanework Seifu
(74) *Attorney, Agent, or Firm* — A. J. Gokcek

(57) ABSTRACT

An apparatus for generating a large volume of gas from a liquid stream is disclosed. The apparatus includes a first channel through which the liquid stream passes. The apparatus also includes a layer of catalyst particles suspended in a solid slurry for generating gas from the liquid stream. The apparatus further includes a second channel through which a mixture of converted liquid and generated gas passes. A heat exchange channel heats the liquid stream. A wicking structure located in the second channel separates the gas generated from the converted liquid.

17 Claims, 16 Drawing Sheets

(51) Int. Cl.
*C10G 2/00* (2006.01)
*B01J 10/00* (2006.01)
*B01J 19/00* (2006.01)
*B01J 19/24* (2006.01)
*B01J 8/00* (2006.01)
*B01J 23/42* (2006.01)
*B01J 23/44* (2006.01)
*B01J 35/00* (2006.01)
*B01J 35/02* (2006.01)

(56) References Cited

U.S. PATENT DOCUMENTS

| | | | |
|---|---|---|---|
| 7,261,961 B2 * | 8/2007 | Kamachi et al. | 429/416 |
| 7,351,395 B1 | 4/2008 | Pez et al. | |
| 7,429,372 B2 | 9/2008 | Pez et al. | |
| 7,485,161 B2 * | 2/2009 | Toseland et al. | 48/61 |
| 2010/0217044 A1 | 8/2010 | Nomura et al. | |

FOREIGN PATENT DOCUMENTS

| | | |
|---|---|---|
| WO | 9634686 | 11/1996 |
| WO | 2005/000457 A2 | 1/2005 |

OTHER PUBLICATIONS

Scherer, G. W. H., et al., Analysis of the Seasonal Energy Storage of Hydrogen in Liquid Organic Hydrides, International Journal of Hydrogen Energy, 23, 1, 1998, 19-25.

Hodoshima, S., et al., Catalytic decalin dehydrogenation/naphthalene hydrogenation pair as a hydrgen source for fuel-cell vehicle, International Journal of Hydrogen Energy, 28, 2003, 1255-1262.

Kariya, N., et al., Efficient evolution of hydrogen from liquid cycloalkanes over Pt-containing catalysts supported on active carbons under "wed-dry multiphase conditions", Applied Catalysis A: General, 233, 2002, 91-102.

Xu, J., et al., Transient flow patterns and bubble slug lengths in parallel microchannels with oxygen gas bubbles produced by catalytic chemical reactions, Internation Journal of Heat and Mass Transfer, 50, 2007, 857-871.

Wang, G., et al., Unstable and stable flow boiling in parallel microchannels and in a single microchannel, International Journal of Heat and Mass Transfer, 50, 2007, 4297-4310.

Yang, J., et al., High capacity hydrogen storage materials: attributes for automotive applications and techniques for materials discovery, Chemical Society Reviews, 39, 2010, 656-675.

Al-Dahhan, M. H., et al., Reproducible Technique for Packing Laboratory-Scale Trickle-Bed Reactors with a Mixture of Catalyst and Fines, Ind. Eng. Chem., Res, 34, 1995, 741-747.

Losey, M. W., et al., Microfabricated Multiphase Packed-Bed Reactors: Characterization of Mass Transfer and Reactions, Ind. Eng. Chem. Res., 40, 2001, 2555-2562.

Ahluwalia, R. K., et al., System Level Analysis of Hydrogen Storage Options, 2007 DOE Hydrogen Program Review, May 15-18, 2007, Arlington, VA.

* cited by examiner

SUSPENDED-SLURRY REACTOR

CROSS-REFERENCE TO RELATED APPLICATIONS

This application claims priority to U.S. Provisional Application Ser. No. 61/593,486, filed Feb. 1, 2012, titled "SUSPENDED-SLURRY REACTOR CONCEPT," hereby incorporated by reference in its entirety for all of its teachings.

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to heterogeneous chemical reactors. More specifically, this invention relates to suspended-slurry chemical reactors for generating a large volume of gas from a liquid stream or for producing liquid from a gaseous stream.

BACKGROUND OF THE INVENTION

Systems involving heat or mass transfer are crucial to our industrialized society. Examples of such systems include: power generation, chemical processing systems, and heating and cooling systems. For more than 100 years, scientists and engineers have endeavored to increase the efficiency or reduce the cost of these systems.

Battelle, Pacific Northwest National Laboratories, and others have been using microtechnology to develop Microsystems for carrying out processes that had previously been conducted using far larger equipment. These systems, which contain features of about 1 millimeter (mm) or less, may potentially change heat and mass transfer processing in ways analogous to the changes that miniaturization have brought to computing. Microsystems can be advantageously used in small scale operations, such as in vehicles. Microsystems that can be economically mass-produced can be connected together to accomplish large scale operations.

The production of hydrogen from hydrocarbon fuels, for use in fuel cells, is one example of an application that has been proposed for microsystems. Fuel cells are electrochemical devices that convert fuel energy directly to electrical energy. For example, in a process known as steam reforming, a microsystem can convert a hydrocarbon fuel (or an alcohol such as methanol or ethanol) to hydrogen and carbon monoxide. The hydrogen is fed to a fuel cell that reacts the hydrogen with oxygen (from the air) to produce water and an electric current. The CO could, in a reaction known as the water gas shift reaction, be reacted with water to produce additional hydrogen and carbon dioxide.

A second application has been proposed for delivering hydrogen to fuel cells that involves liquid organic hydrogen carriers (LOHCs). A chemical reactor is operated that removes molecular hydrogen from a LOHC through one or more dehydrogenation reactions, and the hydrogen is consumed in a fuel cell to produce electricity. The spent dehydrogenated LOHC is recovered and returned to a central facility where reverse hydrogenation reactions reload hydrogen onto the LOHC. By this process, the LOHC serves as a carrier for delivering hydrogen to fuel cells or other power systems in distributed applications, such as on fuel cell powered vehicles.

Despite long and intensive efforts, there remains a need for energy efficient and cost effective systems for carrying out operations involving heat or mass transfer. There is also a need for compact systems or reactor systems for generating large volumes of gas from a liquid stream, for producing large volumes of liquid from a gaseous stream, and for performing a reaction between a gaseous stream and a liquid stream.

SUMMARY OF THE INVENTION

In one embodiment of the present invention, an apparatus for generating large volumes of gas from a liquid stream is disclosed. The apparatus includes a first channel through which the liquid stream passes. The apparatus also includes a layer of catalyst particles suspended in a solid slurry for generating gas from the liquid stream. The apparatus further includes a second channel through which a mixture of converted liquid and generated gas passes.

In one embodiment, the apparatus includes a heat exchange channel for heating the liquid stream. A wicking structure can be located in the second channel for separating the gas generated from the converted liquid.

In one embodiment, the liquid is a liquid organic hydrogen carrier and the gas is hydrogen. The catalyst particles comprise, but are not limited to, $Pt/Al_2O_3$ or $Pd/Al_2O_3$. The catalyst particles are approximately 2 µm or less.

In one embodiment, the solid slurry consists of catalyst particles held together in a solid-like matrix with a polymer. The polymer is, but not limited to, Teflon.

The catalyst particles comprise at least 60% by mass of the solid slurry and more preferably at least 90% by mass of the solid slurry. In another embodiment, greater than 50% of the catalyst is accessible relative to 100% catalyst particles.

In one embodiment, the apparatus further includes a structural element in the first channel to support the suspended slurry and to improve heat transfer.

In one embodiment, the suspended slurry is less than about 0.5 mm thick. In another embodiment, the suspended slurry is less than about 0.15 mm thick.

In one embodiment, the suspended slurry is in a sheet with an area to thickness ratio of at least 10 mm. In another embodiment, the suspended slurry is in a sheet with an area to thickness ratio of at least 1000 mm. In another embodiment, the suspended slurry is in a sheet with an area to thickness ratio of at least 10,000 mm.

In another embodiment of the present invention, a method of generating a large volume of gas from a liquid stream is disclosed. The method includes passing the liquid stream through a first channel; generating gas by passing the liquid stream through a layer of catalyst particles suspended in a solid slurry; and passing a mixture of converted liquid and generated gas through a second channel.

In another embodiment of the present invention, an apparatus for producing liquid from a gaseous stream is disclosed. The apparatus includes a first channel through which the gaseous stream passes. The apparatus also includes a layer of catalyst particles suspended in a solid slurry for generating liquid from the gaseous stream. The apparatus further includes a second channel through which a mixture of converted gas and generated liquid passes.

In another embodiment of the present invention, a method of producing liquid from a gaseous stream is disclosed. The method includes passing the gaseous stream through a first channel; generating liquid by passing the gaseous stream through a layer of catalyst particles suspended in a solid slurry; and passing a mixture of converted gas and generated liquid through a second channel.

In another embodiment of the present invention, an apparatus for performing a reaction between a gaseous stream and a liquid stream is disclosed. The apparatus includes a first channel through which the gaseous stream and the liquid stream passes. The apparatus also includes a layer of catalyst particles suspended in a solid slurry for producing a product from the gaseous and liquid streams. The apparatus further includes a second channel through which a mixture of the gaseous and liquid streams passes.

DETAILED DESCRIPTION OF THE PREFERRED EMBODIMENTS

Embodiments of the present invention include, but are not limited to, the following: an apparatus and method of generating a large volume of gas from a liquid stream; an apparatus and method of producing liquid from a gaseous stream; and an apparatus and method of performing a reaction between a gaseous stream and a liquid stream.

Figure 1:
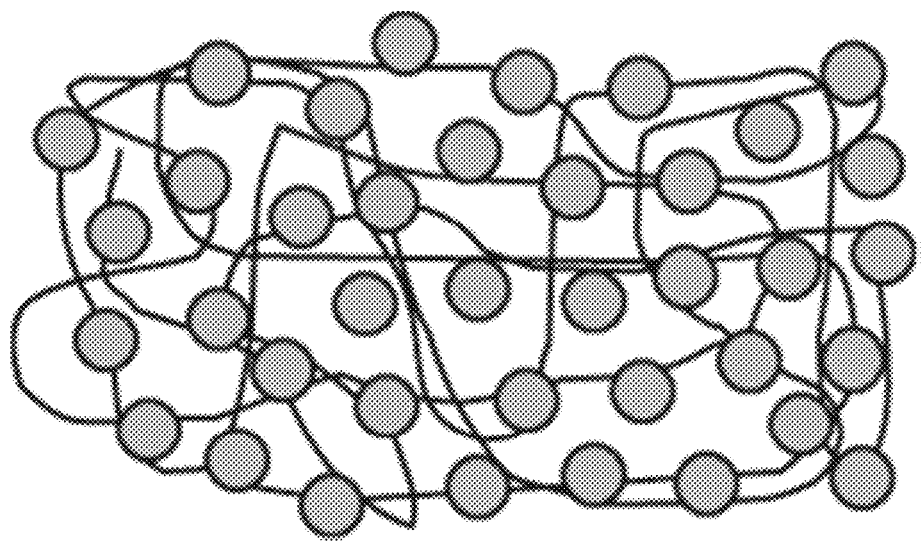
FIG. 1 illustrates morphology of small catalyst particles suspended in a solid slurry.

The suspended-slurry reactor, in certain embodiments, uses very small catalyst particles—diameter on the order of about 1 μm—to decrease internal mass transfer resistance. Pressure drop is a significant challenge in packed beds of micron-sized particles, so one objective is to immobilize the particles in a thin structure that is less than about 1 mm thick and that has a higher void fraction than a packed bed in order to reduce pressure drop. The small particles and inherent tortuosity of the structure reduces external mass transfer resistance by reducing the mass transfer boundary layer thickness around the particles. FIG. 1 illustrates one embodiment of a desired morphology of small catalyst particles suspended in a solid slurry.

The suspended-slurry material may be fabricated by mixing catalyst particles in a solution containing Polytetrafluoroethylene (PTFE) nano-particles. The mixture is mechanically worked and the viscosity increases until the material can be rolled into a sheet. After repeatedly folding and re-rolling the material it becomes a rubbery membrane-like sheet, which can be rolled to specific thickness and dried. Physically the PTFE particles create bridges between the catalyst particles, and as the material is mechanically worked, the PTFE is drawn into filaments between the catalyst particles, creating a structure conceptually similar to what is shown schematically in FIG. 1.

Figure 2:
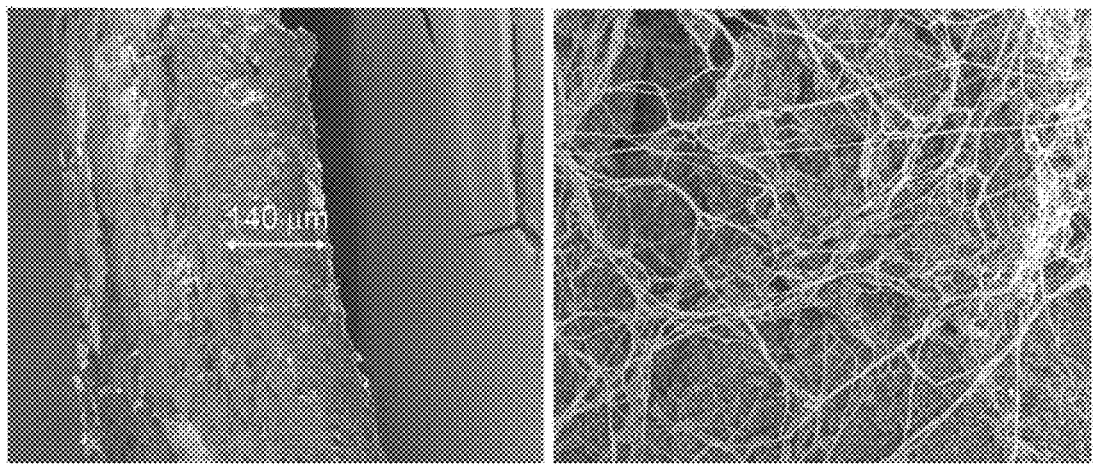
FIG. 2 is a scanning electron micrograph of a suspended-slurry structure with 93.4% by mass of 5 wt % $Pt/Al_2O_3$ catalyst.

The suspended-slurry structure has a narrow size distribution of particles uniformly spatially distributed, as illustrated in FIG. 1, and where the PTFE has minimal impact on the accessibility of the Pt catalyst. For proof-of-concept, one of the focuses was on fabricating materials that could be tested with minimal effort on optimizing the structure. While some effort was made to investigate and standardize the fabrication process using a mechanical rolling machine, a manual rolling process was found to be more reliable and repeatable. Even with this process, significant variability was observed in the behavior of the material. In some instances, starting from the same recipe, the material would become flaky instead of rubbery. Other times, the material would form cracks during the drying process. The micrograph in FIG. 2 shows an example of a suspended-slurry structure.

Figure 3:
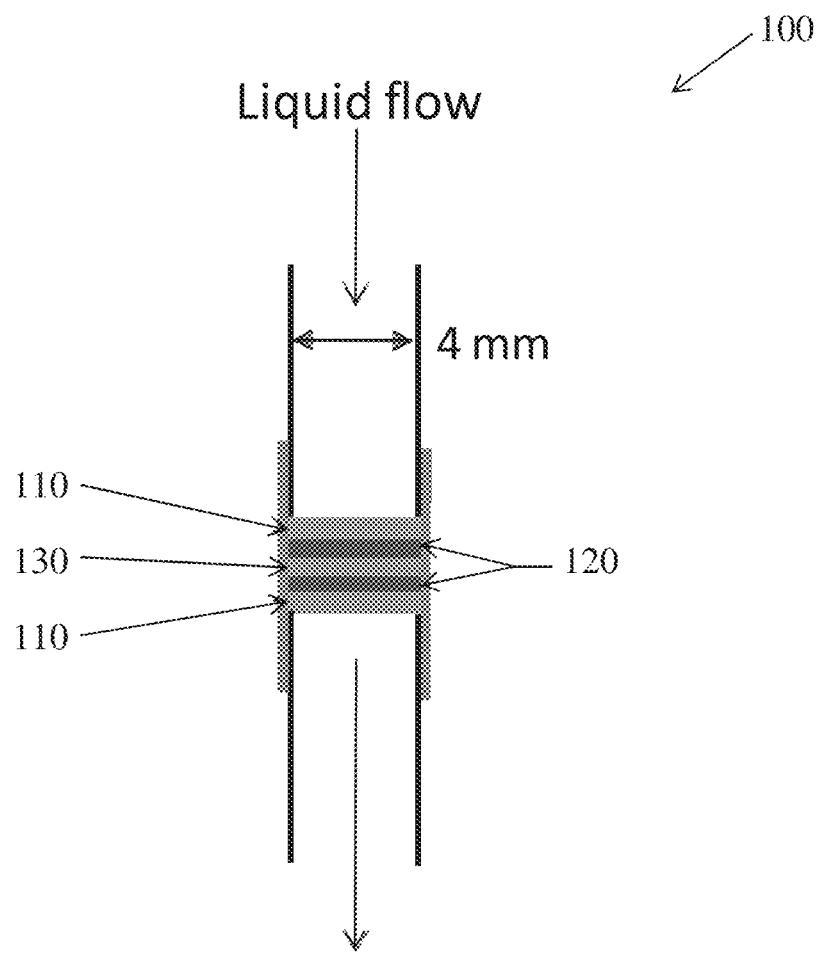
FIG. 3 shows a test cell used for characterizing performance of suspended-slurry samples, in accordance with one embodiment of the present invention.

Proof-of-principle experiments were performed with 0.25-inch diameter circular samples punched from sheets of suspended-slurry material. The samples were loaded in a membrane test cell and heated with resistance heaters wrapped around the cell. The test cell 100, as shown in FIG. 3, consisted of a 0.25 inch Swagelok fitting and an upper and lower 0.25 inch stainless steel tubes. The test cell 100 includes Teflon o-rings 110, porous metal sheets 120 and slurry sample 130. The slurry sample 130 was supported on both sides with a 50% dense stainless steel porous metal sheet 120 and the cell was sealed by compressing the upper and bottom tubes against the Teflon o-rings 110 using standard 0.25 inch Swagelok nuts and tubes were sealed against the fitting using 0.25 inch Teflon ferrules.

Figure 4A:
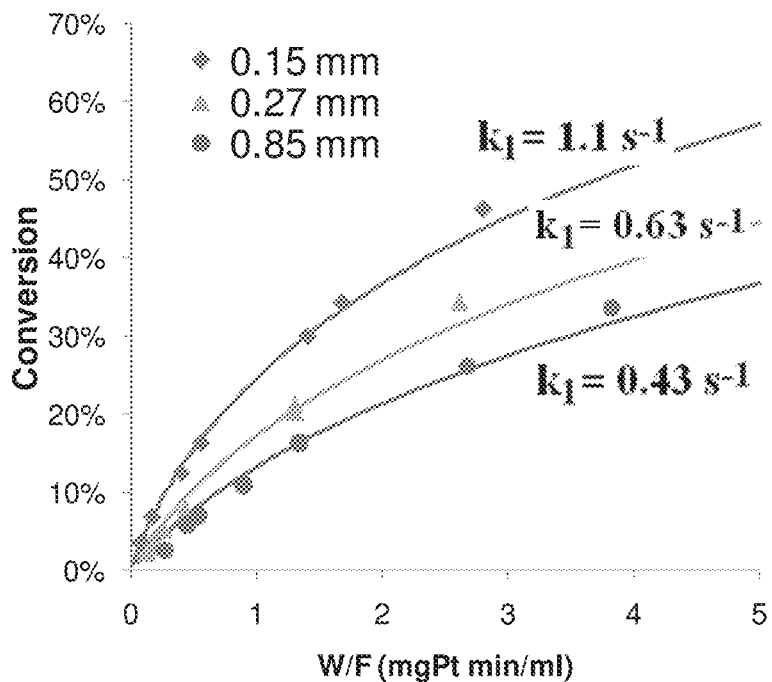
FIGS. 4A and 4B show the effects of suspended-slurry thickness (key indicates number of layers by layer thickness) on the conversion of perhydro-N-ethylcarbazole conversion at 230° C. and 1 atm with 5% $Pt/Al_2O_3$. Solid lines represent first-order reaction kinetics, and k1 is the corresponding rate constant.

A number of materials were made and tested with varying thicknesses and catalyst loadings. Performance was characterized by fitting $H_2$ yield (conversion) data to a kinetic rate expression that is first order in perhydro-N-ethylcarbazole (NEC) concentration to obtain a rate constant. This is a simplification of the 3-step reaction sequence that produces 3 hydrogen molecules per carbazole, but facilitates comparing relative performance to the target. A rate constant of 0.91 s$^{-1}$ corresponds to the catalyst productivity target of 2 g$_{H2}$/min/g$_{Pt}$ at 90% $H_2$ yield. FIG. 4A shows that the target productivity can be achieved with this suspended slurry concept. The performance of the 0.15 mm thick suspended slurry is 8.5× better than a packed bed of 210-400 µm particles at a similar bed diameter.

Figure 4B:
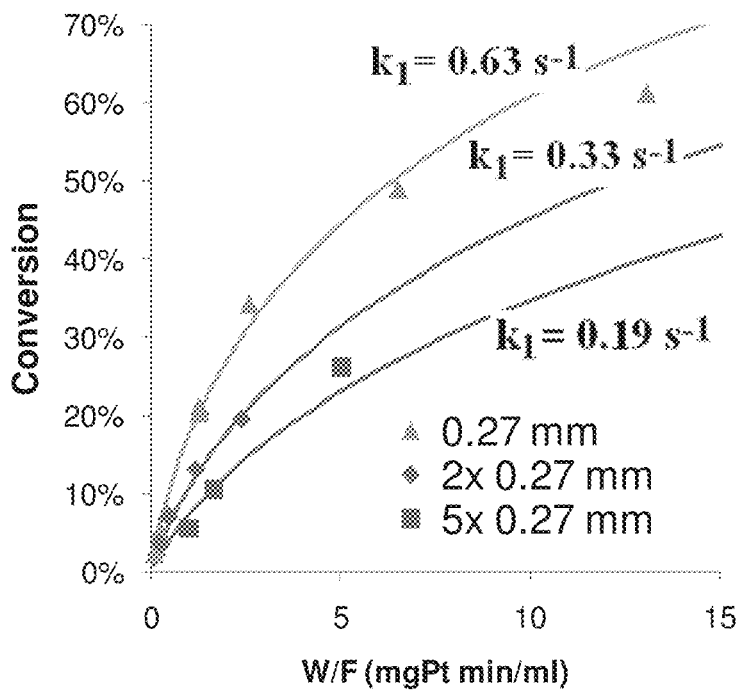
Figure 5:
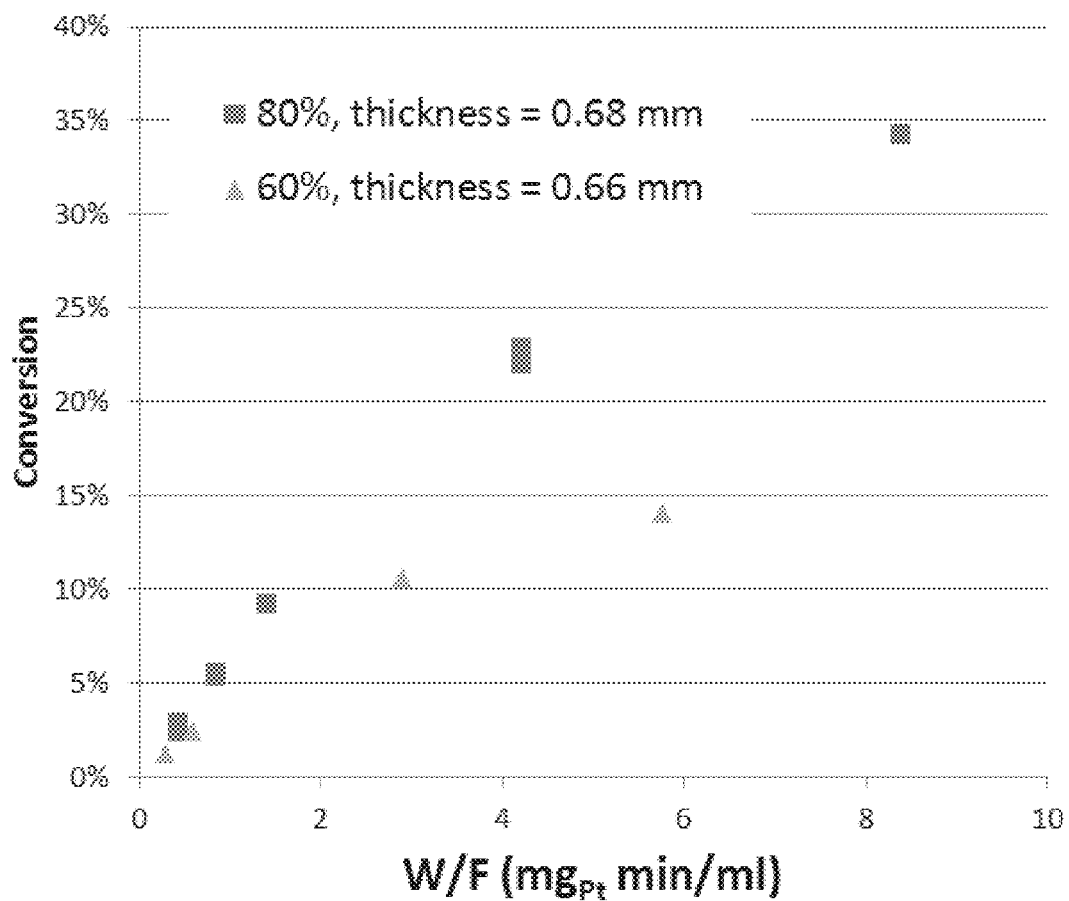
FIG. 5 shows the effect of catalyst loading on the conversion of perhydro-N-ethylcarbazole conversion at 230° C. and 1 atm with 5% $Pt/Al_2O_3$. The % in the legend refers to the catalyst weight % in the suspended-slurry.

Factors that affect suspended-slurry reactor performance are catalyst loading, thickness, pressure drop, and the amount of Platinum catalyst that is accessible to the reactants. FIGS. 4A and 4B show that thinner suspended slurries have higher catalyst utilization. Stacking 2 layers of the 0.27 mm thick samples gave minimal additional $H_2$ production over the single layer, as shown in FIG. 4B, while stacking of 5 layers did provide additional $H_2$, albeit at lower catalyst productivity. Comparisons were also made of different catalyst loadings up to 96 wt % catalyst. FIG. 5 shows the effect of catalyst loading on performance. In general, higher catalyst loadings show higher productivities, which is attributed to more accessibility of the Pt—higher PTFE fractions causes more coverage of the particle surface. Table 1 below shows that compared to the powder catalyst only 34-59% of the Pt is accessible in the suspended slurry, as determined by $H_2$ chemisorption measurements.

TABLE 1

Hydrogen chemisorptions results indicating percentage of Pt catalyst accessible to reactants.

| Wt % catalyst in membrane$^a$ | $H_2$ uptake (mmoles/g$_{cat}$) | % accessible catalyst | Thickness (mm) |
|---|---|---|---|
| 100% (powder) | 63 | 100% | — |
| 60% | 35 | 56% | 660 |
| 82% | 32 | 50% | 170 |
| 93.4% | 21 | 34% | 270 |
| 93.7% | 29 | 46% | 190 |
| 98% | 37 | 59% | 320 |

Figure 6:
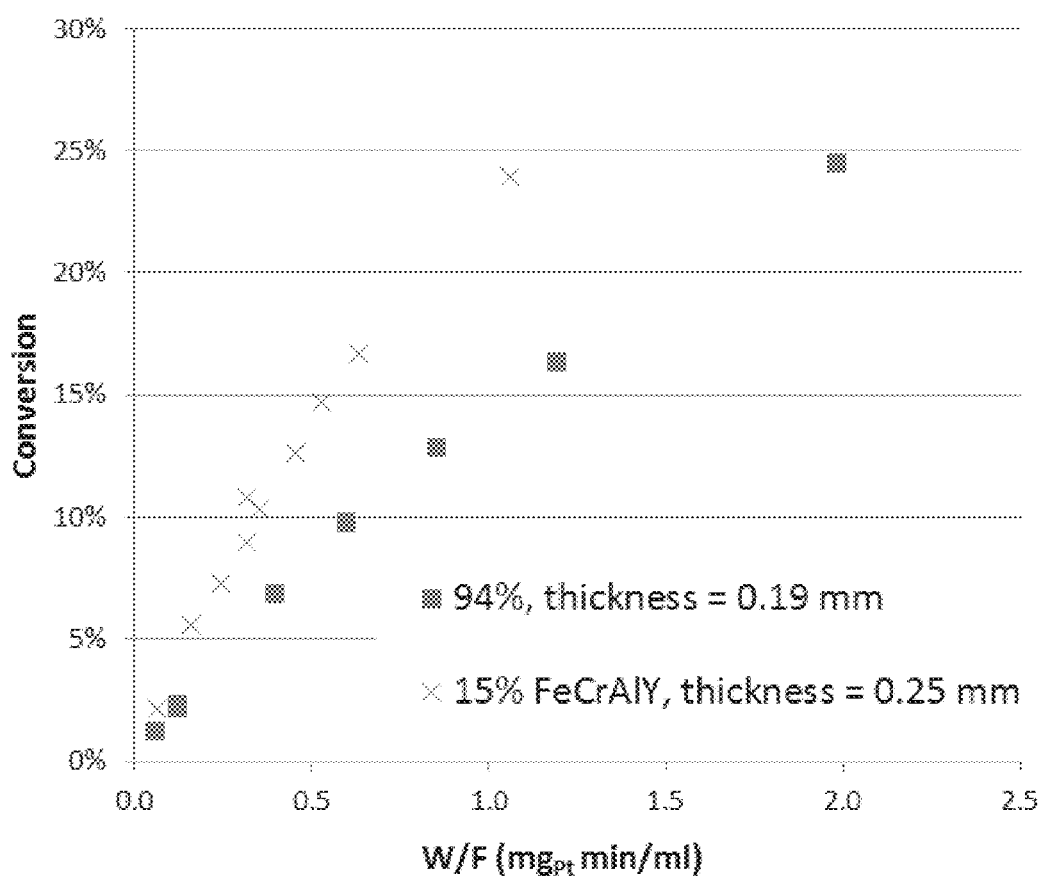
FIG. 6 shows a comparison of FeCrAlY sintered-fiber mesh to suspended slurry concept. The % in the legend refers to the catalyst weight % in the suspended-slurry or the sintered metal.

The suspended slurry reactor implements the concept of a very thin catalyst bed with a very large flow area to reduce pressure drop associated with small catalyst particles. Alternative concepts for accomplishing this were also investigated, including coating catalyst onto thin pieces of porous sintered metal FeCrAlY. Results shown in FIG. 6 indicate that higher catalyst productivities were achieved with the sintered metal than with the suspended slurry. However, catalyst loadings on the sintered metal were significantly lower than with the suspended slurry, so performance was lower when compared on a bed mass basis. In addition, variability in thickness and porosity of the sintered metal material gave poorer reproducibility. Therefore, the suspended slurry is an improved embodiment for developing a compact, low mass dehydrogenation reactor.

The suspended slurry concept was implemented in a test reactor that was designed to produce at least 0.1 g/min of $H_2$ to support approximately 100 W$_e$ of power production from a PEM fuel cell. The objectives were to demonstrate a reactor design that is compact; is scalable to higher power production; is heated with a hot as stream; and can be configured with multiple stages, if necessary to achieve high hydrogen yield from the carrier.

Figure 7:
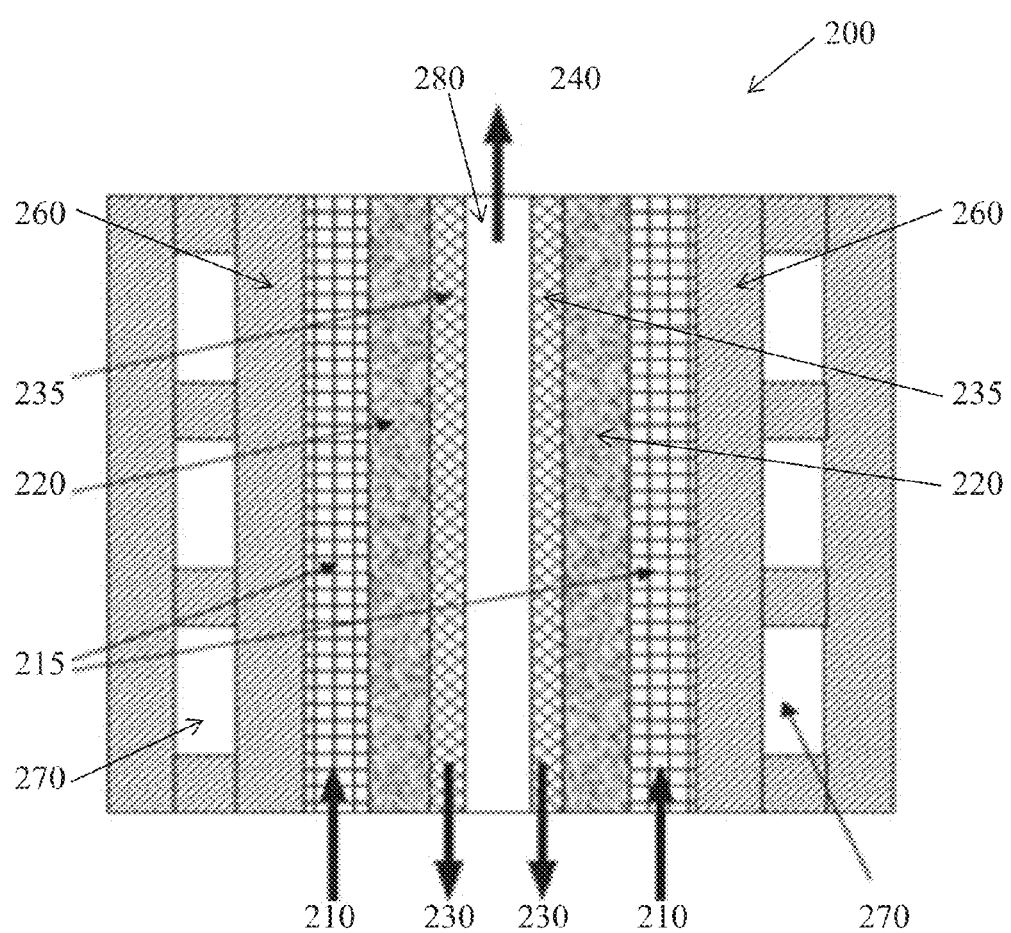
FIG. 7 illustrates a schematic of the suspended-slurry reactor, in accordance with one embodiment of the present invention.

One embodiment of a planar, laminate microreactor design that was demonstrated is shown in FIG. 7. FIG. 7 shows one embodiment of a suspended-slurry microreactor 200 for separating the $H_2$ 240 generated from spent or dehydrogenated liquid organic hydrogen carrier (LOHC) 230 using a wicking structure. On the other side of each suspended slurry sheet or membrane 220 are feed channels 215 that distribute hydrogenated or feed LOHC 210 over the entire area of the slurry sheet. Adjacent to the feed channels 215 and separated by a solid wall 260 are heat transfer channels 270 for supplying heat for the dehydrogenation reaction. Adequate heat transfer to the catalyst in the suspended slurry 220 is critical for maintaining reaction temperature in order to achieve high catalyst productivity. The concept is scalable to higher $H_2$ production rates by repeating the structure shown in FIG. 7 to the left and right. Adjacent to the slurry sheet 220 on the opposite side of the feed channel 215 is an effluent channel 280 for removing the hydrogen 240 and dehydrogenated LOHC 230 from the reactor. An optional wick structure 235 can be placed in the effluent channel 280 that preferentially sorbs the liquid (LOHC) and enables gravity separation of the dehydrogenated LOHC 230 from the hydrogen gas 240. One alternative for achieving high $H_2$ yield is to have multiple stages where the dehydrogenated LOHC 230 is fed to a series of suspended-slurry reactors by feeding the LOHC 230 from a first reactor to feed LOHC 210 to a second reactor to obtain higher conversion. The generated $H_2$ 240 flows through a gas flow channel.

An objective of the Proof-of-Principle reactor shown in the embodiments of FIGS. 8, 9, 10, and 11, was to achieve 0.1 g/min $H_2$ production at a minimum of 90% conversion in a device that reduced to practice the suspended-slurry reactor concept shown in FIG. 7. The design basis assumed a catalyst productivity of 1 g$_{H2}$/min/g$_{Pt}$. Based on a catalyst loading of 1.025 mg Pt/cm$^2$ in 190 µm thick suspended-slurry material, the required area is 98 cm$^2$. The reactor concept in FIG. 7 was implemented in the design shown in FIGS. 8 and 9. In one embodiment, each plate in FIG. 8 has a suspend-slurry sheet with an active area of about 1.375 inches by 3.1 inches for an active area of about 4.3 in.$^2$ (27.5 cm$^2$). In one embodiment, Dexmet SS13-077-DB expanded metal screen is placed in the LOHC feed channel. The screen supports a sintered porous metal layer and then the catalytic suspended-slurry layer backed by a second sintered metal layer. Dexmet SS-13-077-DB expanded metal screen is placed on top completing the stack.

Figure 8:
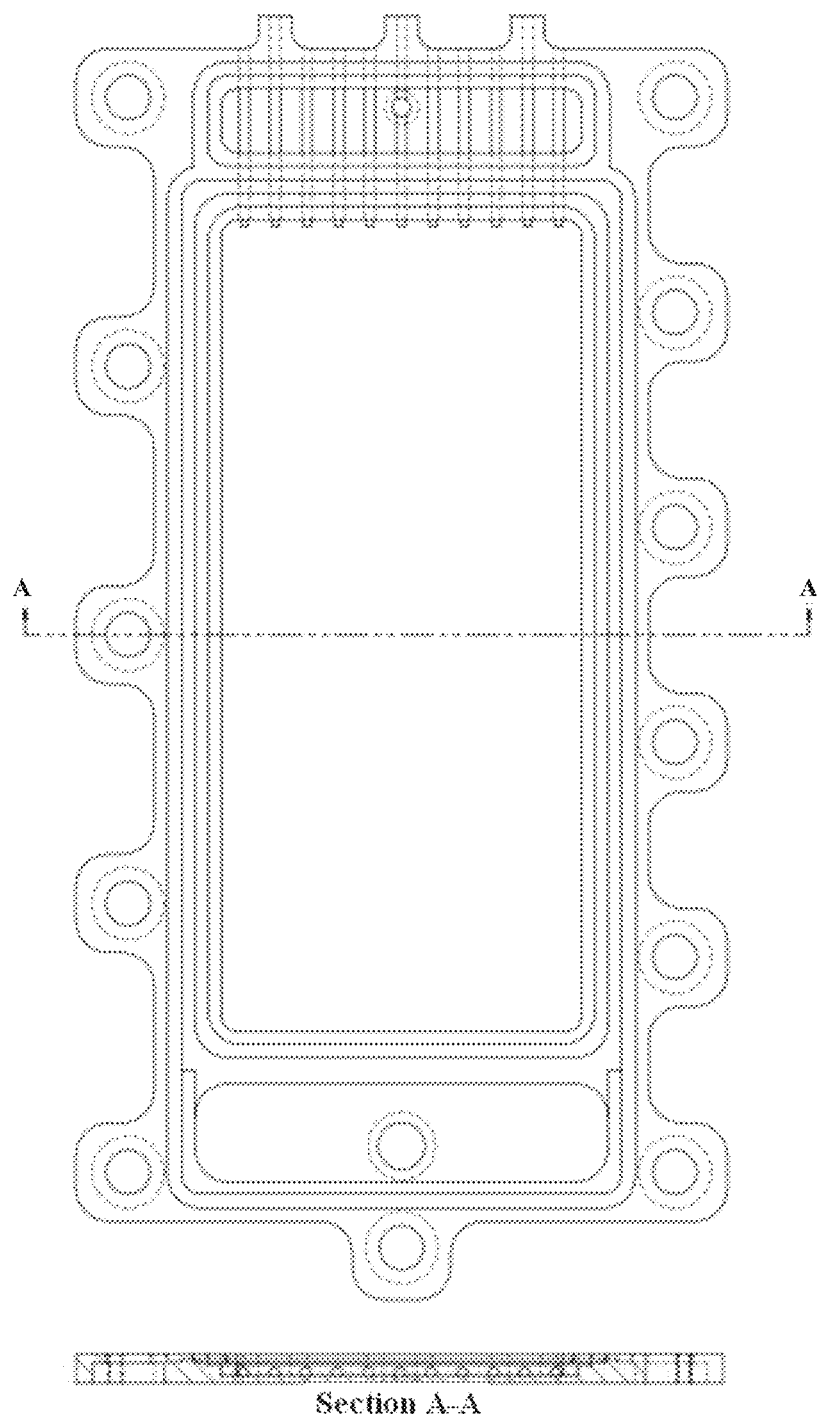
FIG. 8 is a fabrication drawing of a reactor plate of the suspended-slurry reactor of FIG. 7, with a side cross-sectional view along 'A-A' of the reactor, in accordance with one embodiment of the present invention.
Figure 9:
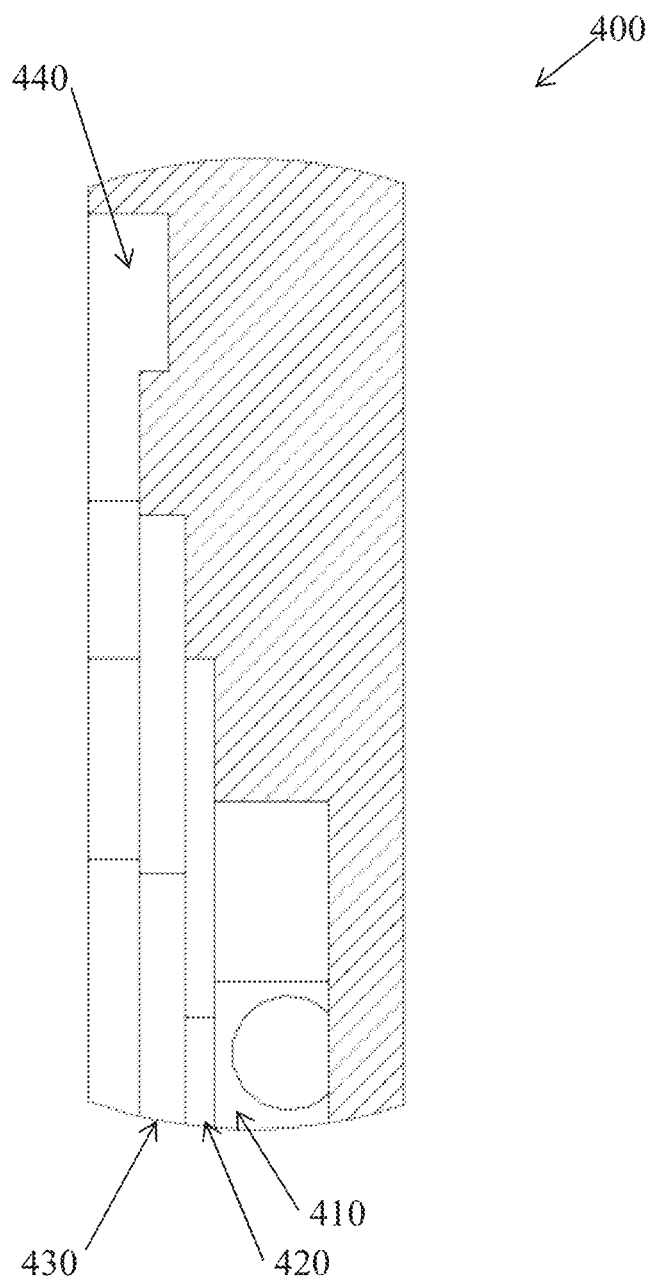
FIG. 9 is a cut-out of the cross-sectional view of the reactor plate of FIG. 8, in accordance with one embodiment of the present invention.

FIG. 9 is a cut-out of the cross-sectional view of the reactor plate of FIG. 8, in accordance with one embodiment of the present invention. The reactor plate 400 of FIG. 9 includes a LOHC feed channel 410, a sintered metal support layer 420, a layer for suspended slurry and a second metal support layer 430, and an effluent channel with gasket groove 440 for sealing the device.

A second mirror-image of the stack is placed on top of the first in a clamshell, so each two-plate assembly has 55 cm$^2$ of area. The assembly is bolted together and has a feed port on one end and an effluent port at the other. Holes are also drilled for 3 thermocouples to be inserted in the feed channel between the heat transfer plate and the suspended-slurry to measure local temperatures in the feed channel. Two 2-plate assemblies are stacked together in the 100-Watt Proof-of-Principle III reactor to obtain a total of 110 cm² of active suspended-slurry area.

Figure 10:
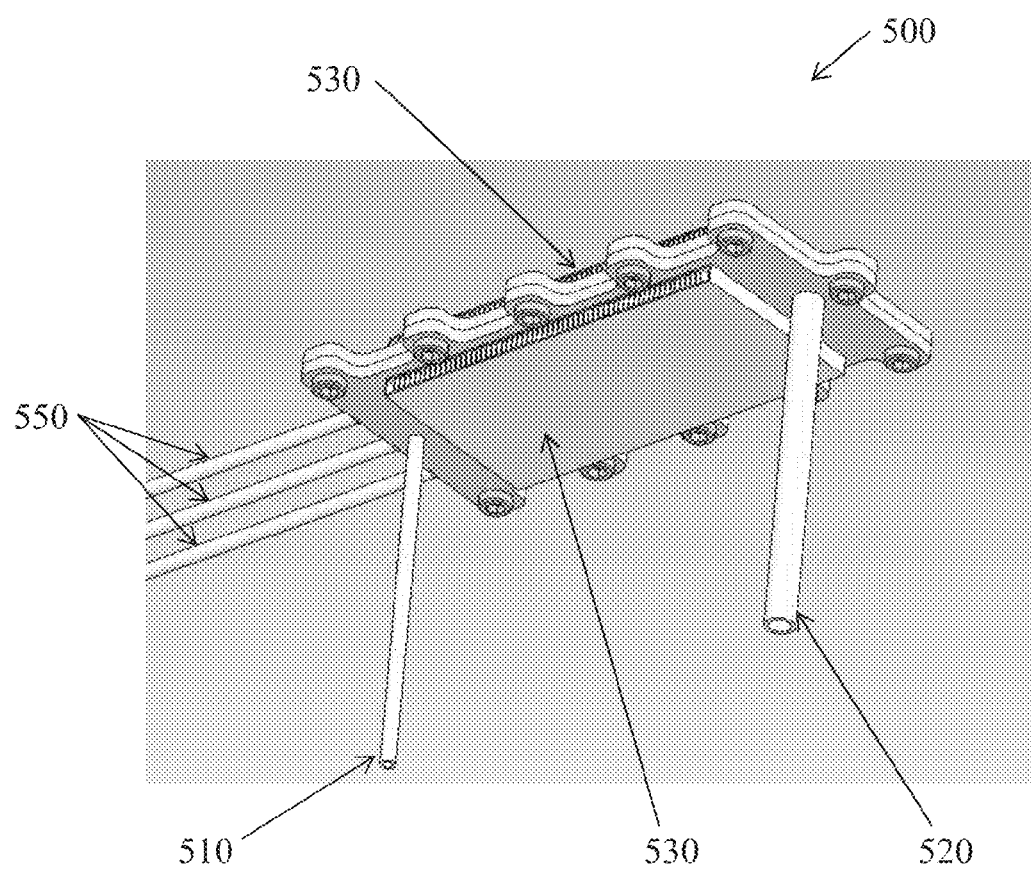
FIG. 10 illustrates a suspended-slurry reactor with heat transfer elements attached to both sides, in accordance with another embodiment of the present invention.

The heat exchanger elements for heating with a hot gas were extruded aluminum structures. The dimensions of the flow channels are 1 mm×3.1 mm separated by 0.3 mm webs that provide extended heat transfer area, and the total width is 7.8 cm with 60 flow channels. Sections of the material were cut to 3.49 cm length and placed on both sides of the reactor clamshell assembly as shown in FIG. 10, which represents one reactor 500 repeat unit. The reactor 500 of FIG. 10 includes a channel 510 for liquid entering the reactor 500 and a channel 520 for liquid and hydrogen exiting the reactor 500. The reactor 500 also includes heat exchangers 530 and thermocouple tubes 550.

Figure 11:
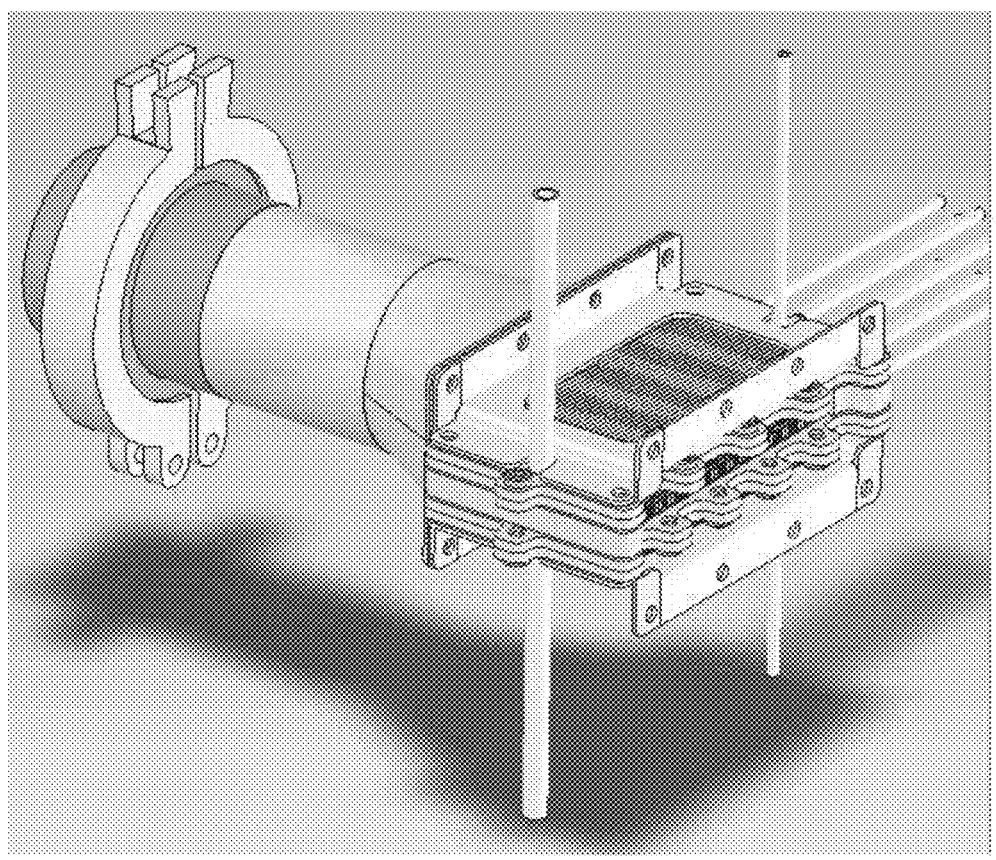
FIG. 11 illustrates a suspended-slurry reactor with two reactor repeat units stacked together with heat transfer elements on both sides and a manifold for heating with a hot gas.

High temperature heat transfer paste was applied between the heat exchanger elements and the reactor plates. Two reactor repeat units were stacked together and a hot-gas manifold bolted onto the front of the assembly as shown in FIG. 11, which represents the complete 100-Watt-scale Proof-of-Principle reactor.

Heat transfer calculations were performed to estimate the flow rate and temperature of hot gas needed to generate 0.1 g/min of $H_2$. Using 51.7 kJ/mol $H_2$ for the heat of reaction, the calculated heat duty was 57.5 W including 15 W of sensible duty. The assumed contributions to the overall heat transfer coefficient were hot gas convective resistance, wall resistance, and conduction through the LOHC feed channel. The benefits of the support screen and convection in the LOHC feed channel were neglected. The overall heat transfer resistance was estimated to be 120 cm²·K/W, with 72% being attributed to the LOHC channel. At 20 SLPM of hot gas flow, this heat transfer coefficient will supply the required heat flux with a temperature drop from 380° C. hot gas inlet temperature to 253° C. outlet temperature.

A notable step in demonstrating the Proof-of-Principle reactor was scaling up the suspended-slurry area from 0.14 cm² in the test cell to 27.5 cm² for each of 4 pieces in the reactor, representing two orders of magnitude increase in area. Consequently, an intermediate scale-up was performed with a ½-inch test cell that had an active area of 0.7 cm². Results from the larger test cell showed a significant decrease in suspended-slurry performance. The possible explanations included heat transfer limitations, higher incidence of pin holes in the larger area, and inconsistency in thickness and structure of the suspend slurry. A series of packed bed tests were performed to better understand the relative importance of heat and mass transfer in this reaction system. The importance of heat transfer relative to mass transfer was investigated by comparing results from two tube diameters at the same space velocity and at the same linear velocity. In addition, the effect of diluting the catalyst bed with inert particles was also measured to discern the importance of heat transfer. Finally, the particles were also diluted to understand the relative importance of interparticle mass transfer.

Figure 12:
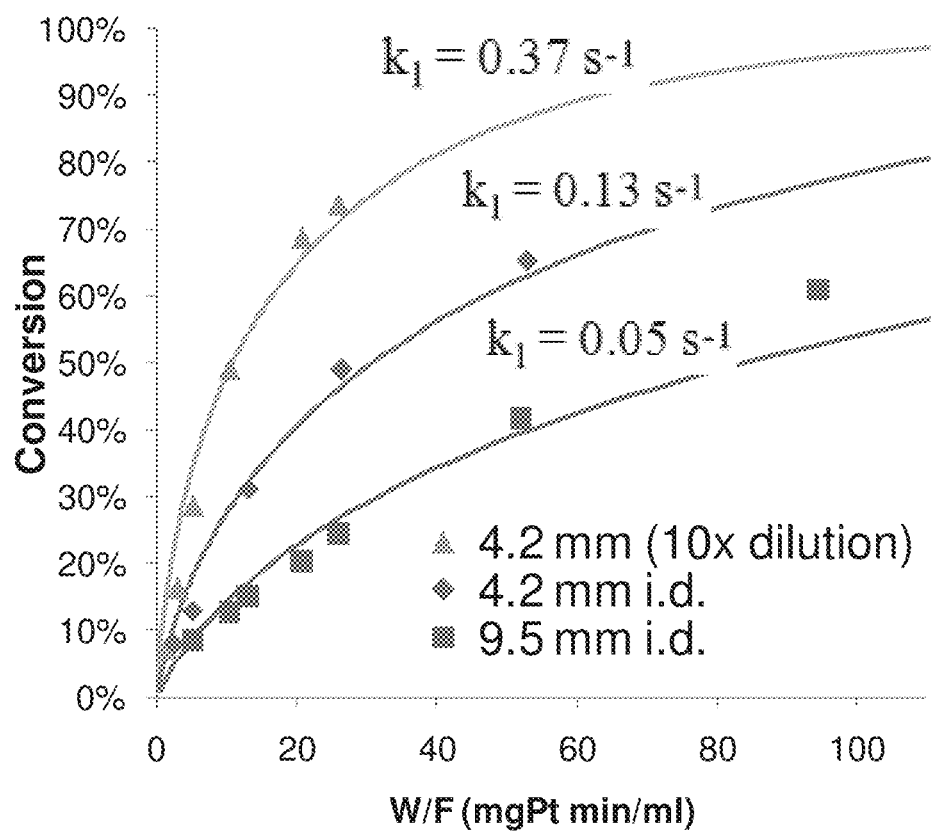
FIG. 12 shows the effect of catalyst dilution and bed diameter on NEC conversion in the suspended-slurry reactor of FIG. 3 at 230° C. and 1 atm with 5 wt % $Pt/Al_2O_3$.

The higher apparent activity in the smaller diameter packed bed at the same linear velocity, as evidenced by the data in FIG. 12, indicates the heat transfer limitations of the packed bed reactor, because the mass transfer limitations are comparable. This conclusion is further supported when the smaller diameter bed is diluted with inert particles. The lower Reynolds number at a given space velocity is expected to increase the external mass transfer resistance by increasing the diffusion boundary layer. However, the apparent activity increases, as shown in FIG. 12, implying that heat transfer is of greater importance than external mass transfer.

Figure 13:
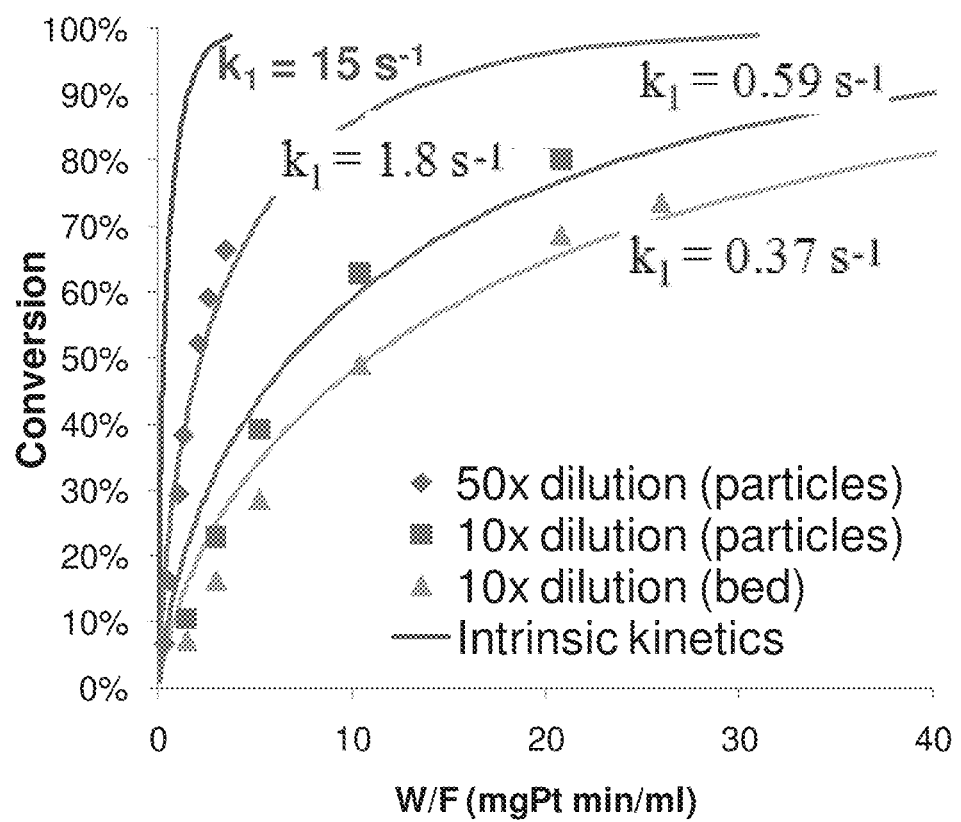
FIG. 13 shows the increase in apparent activity when catalyst particles are diluted, and the relative importance of interparticle mass transfer on conversion of NEC in a 4.2 mm diameter suspended-slurry reactor of FIG. 3 at 230° C. and 1 atm with 5 wt % $Pt/Al_2O_3$.

The importance of internal mass transfer resistance in the particles was determined by diluting the particles. Catalyst particles containing 5 wt % Platinum were crushed to a powder, mixed with inert alumina powder, and reformed into particles. FIG. 13 shows the increase in apparent activity when the catalyst particles are diluted, confirming the strong effect of internal mass transfer in the particles.

The packed bed experimental results supported the conclusion that heat transfer was limiting in the scaled-up ½-inch suspended slurry reactor cell. Subsequent modifications to enhance heat conduction into the cell caused the activity to recover to almost the same level of the smaller ¼-inch cell. Although the same approach to enhance heat transfer is not feasible in the proof-of-principle reactor, it accentuates the importance of ensuring sufficient heat transfer in scaling up the suspended slurry reactor.

The sintered metal pieces used on both sides of the suspended slurry materials were obtained from ADMA with specifications of 304 stainless steel, 45% dense, and 0.010 inch thickness. In order to obtain more uniform flow distribution by increasing pressure drop, the ADMA material was densified by rolling to a thickness of 0.005 inch. The reactor was assembled with total of 5 g of 5 wt % Pt catalyst; the two reactor subassemblies contained 2.8 and 2.2 g of catalyst. The reactor was reduced with 100 sccm flow of 50% $H_2$ in $N_2$ at 235° C. for 2 hours.

A 200-Watt heater was installed on the $N_2$ gas supplied to the cross-flow heat exchangers. The reactor was preheated to 235° C. before starting 10 ml/min of perhydro-N-ethylcarbazole, the initial hydrogen output was 1.4 slpm, but the hydrogen flow decreased to about 200 sccm. The decrease in hydrogen output was accompanied by a decrease in reactor temperature from about 235° C. to 200° C. In addition, there was a 25° C. temperature difference in the average temperature in the feed channels of the two reactors. Decreasing the feed flow to 5 ml/min caused the reactor temperatures to increase to 190° C. and 215° C. and the $H_2$ produced to drop to 180 sccm. Dropping the feed flow further to 1 ml/min allowed the temperatures to recover to 215° C. and 233° C. and the $H_2$ to increase to 320 sccm. The initial hydrogen flow exceeded the 100 $W_e$ equivalent $H_2$ flow confirming the potential for the Proof-of-Principle reactor to meet the design productivity. The thermal mass of the reactor, ducting, and housing was a source of heat during reactor start-up that produced the high $H_2$ flow. However, the 200 W heater was undersized for maintaining the desired 230° C. reaction temperature in the two reactors.

Subsequently, the hot gas heater was replaced with a 400 W heater and needle valves were installed on the effluent lines from each reactor in order to balance the flows. Only the second reactor was operated in further testing. Operating with 5 ml/min of NEC feed, and only half reactor produced 320 sccm of $H_2$ at 210° C. average reactor temperature, which increased to 535 sccm at 240° C. $H_2$ yields were 11% and 18%, respectively. At the lower feed flow of 1.2 ml/min at 238° C., 300 sccm of $H_2$ flow (H2 yield of 41%).

Additional testing was performed at lower feed flow rates and samples of the spent LOHC were collected and analyzed by Air Products using a GC/MS. The samples are listed in Table 2 along with operating conditions and $H_2$ flow. $H_2$ yield is calculated based on the NEC feed flow rate and the measured $H_2$ production. Sample compositions are provided in Table 3 showing the breakdown of the dehydrogenated intermediates. $H_2$ yield is calculated by weighing the composition. There is a significant discrepancy in $H_2$ yield indicated by $H_2$ produced versus the measured composition. This is most likely due to loss of the perhydro-NEC feed from a leak in the second reactor. In addition, the compositions indicate significant bypass within the reactor that is likely due to internal leaks. For example, the dehydrogenation steps are progressively slower, so neat perhydro-NEC (MW 207) would not be detected without the MW 203 intermediate unless there was bypass. Sample 150141-119-1 contained almost 11% feed without any MW 203 intermediate. Yield from the NEC that was converted reached almost 90%.

TABLE 2

Samples obtained from operating half of the PoP III reactor with corresponding average reactor temperature, $H_2$ flow and yield.

| Sample | Feed flow (ml/min) | Time on stream (min) | Reactor temp (° C.) | $H_2$ flow (sccm) | $H_2$ yield[a] |
|---|---|---|---|---|---|
| 15041-119-1 | 1.0 | 0-15 | 230 | 300 | 50% |
| 15041-119-2 | 1.0 | 20-30 | 230 | 180 | 30% |
| 15041-120-1 | 0.5 | 60-100 | 230 | 140 | 45% |
| 15041-120-1 | 1.0 | 120-130 | 230 | 180 | 30% |

[a]Based on $H_2$ flow.
[b]May contain some liquid from earlier time.

TABLE 3

Compositions determined by gas chromatography and mass spec of samples obtained during operation of the PoP III half-reactor.

| Sample | MW 207 | MW 203 | MW 199 | MW 195 | $H_2$ yield (GC/MS) | Converted $H_2$ yield[a] |
|---|---|---|---|---|---|---|
| 15041-119-1 | 10.9% | 0% | 30.3% | 58.8% | 79.1% | 88.7% |
| 15041-119-2 | 27.3% | 16.0% | 28.6% | 28.1% | 52.6% | 72.2% |
| 15041-120-1 | 20.6% | 15.6% | 32.0% | 31.8% | 58.3% | 73.5% |
| 15041-120-2 | 35.9% | 19.4% | 29.4% | 15.4% | 41.4% | 64.7% |

[a]Yield from the perhydro-NEC that was converted to at least MW 203.

Figure 14:
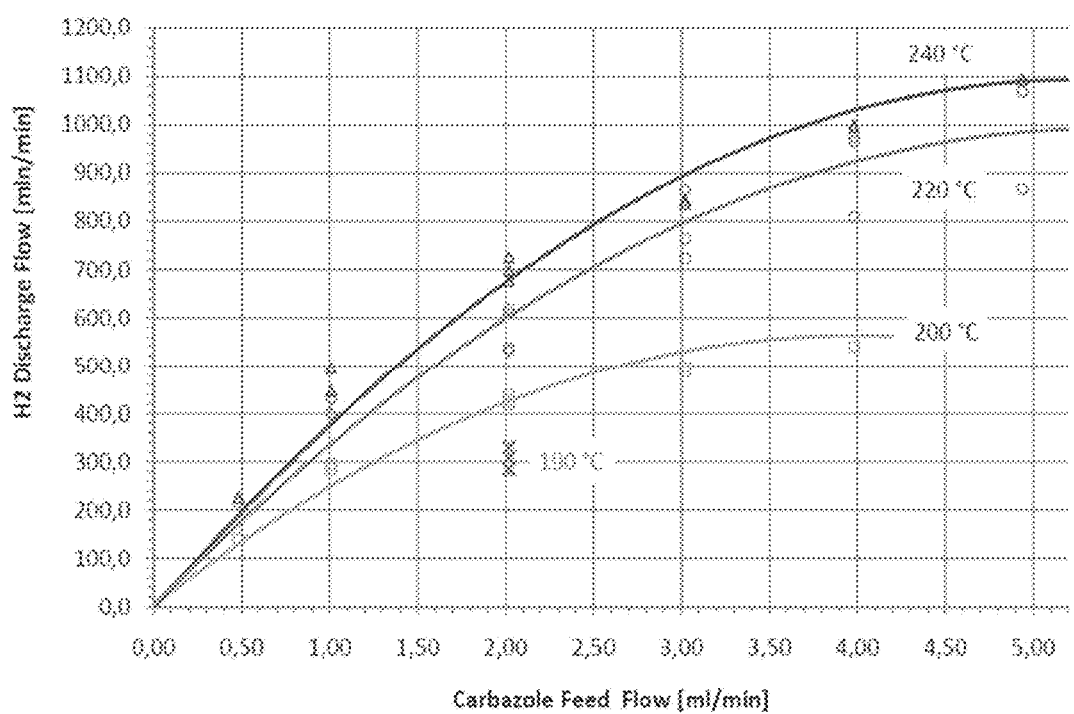
FIG. 14 shows measured data for the amount of hydrogen produced from the reactor of FIG. 11 as a function of operating temperature and perhydro-NEC feed flow rate, as well as curves fitted to the data for 200° C., 220° C., and 240° C.
Figure 15:
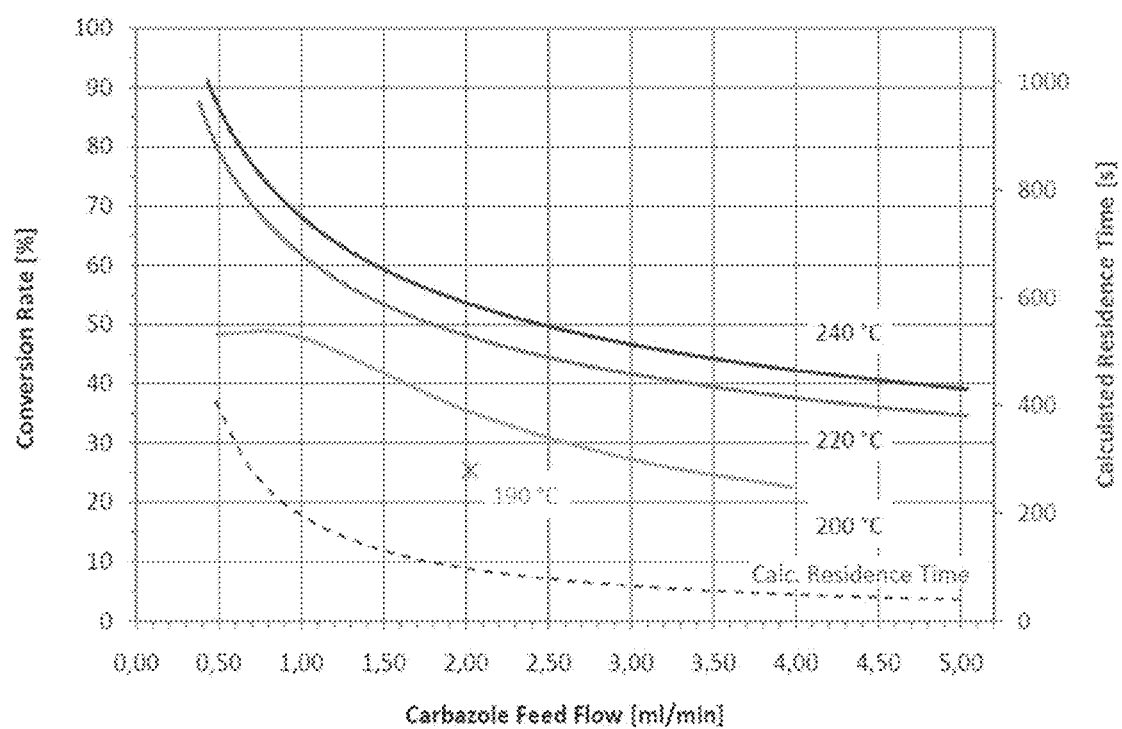
FIG. 15 shows the fitted curves from FIG. 14 converted to percent conversion of the carbazole (same as hydrogen field) based on the feed flow rate of perhydro-NEC. Also shown is the residence time (dashed line) calculated from the internal void volume and feed flow rate.

The Proof-of-Principle reactor shown in FIG. 10 was taken apart, the four suspended-slurry sheets were replaced, and the reactor reassembled with new gaskets. Additional testing was performed with both of the clamshell reactors operating over a range of flow of perhydro-NEC and at 190° C., 200° C., 220° C., and 240° C. The data in FIG. 14 show measurements of the amount of $H_2$ produced from the reactor at a given temperature and feed flow rate of carbazole along with curves fitted to the data. The fitted curves are converted to conversion rates by mass balance which are shown in FIG. 15. FIG. 15 also shows the calculated average residence time based on the internal void volume in the reactor and the feed flow rate. The reactor was able to produce over 1 liter of hydrogen at 240° C. with 42% conversion of carbazole at a feed flow rate of 4.0 ml/min of carbazole feed.

Moderate success was achieved in meeting the objectives of the Proof-of-Principle reactor. While $H_2$ flow required for 100 $W_e$ equivalent power was achieved, it was at significantly lower than the 90% target $H_2$ yield. This was attributed to both external and internal leaks which prevented all the feed from being processed through the suspended slurry. Assuming all of the unreacted perhydro-NEC was bypass, then the $H_2$ yield approached the desired 90%. Developing better control of the suspended slurry thickness in the fabrication process and future design modifications will alleviate these difficulties.

The core of the Proof-of-Principle reactor—the active suspended-slurry area times the stack height including heat exchangers—that would need to be scaled-up for a given application is 75 ml and has a heat exchange area to volume ratio of 149 $m^2/m^3$. Achieving the design goal of 100 $W_e$ equivalent power at 90% LOHC conversion would give a power density of 1.3 kW/L. This translates into a total reactor volume of 45 liters (1.6 $ft^3$) for a 60 $kW_e$ primary power plant for a vehicle. There is high confidence that this is achievable with additional suspended-slurry development and reactor design iterations. In addition, the power density could be increased by 2.4× if the best measured suspend-slurry performance was realized in a reactor. Furthermore, there is the potential for an increase of 33× if the suspended-slurry performance were to approach the intrinsic kinetics of the catalyst.

Figure 16:
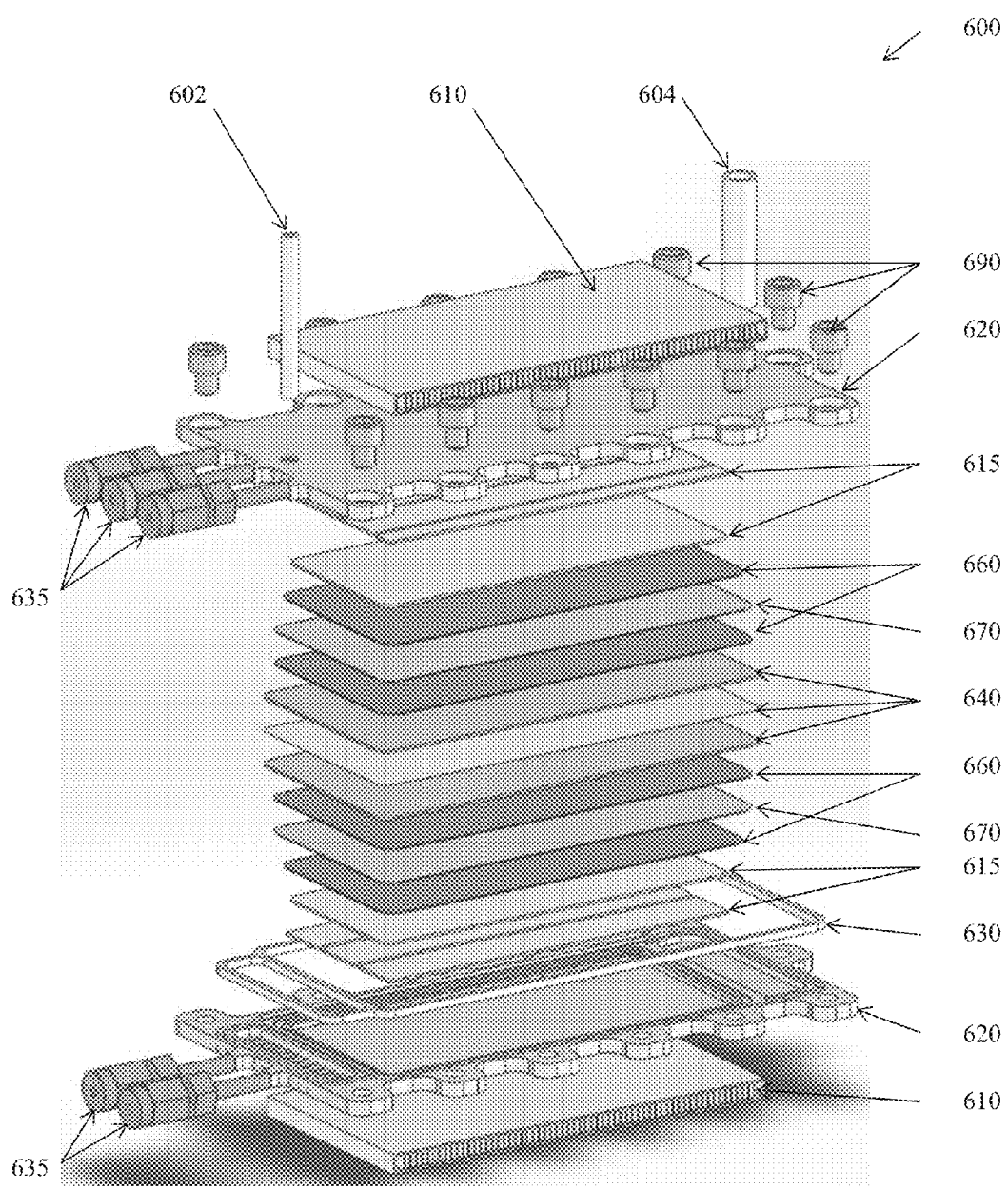
FIG. 16 illustrates an exploded assembly view of the suspended-slurry reactor of FIG. 10, in accordance with one embodiment of the present invention.

FIG. 16 illustrates an exploded assembly view of a suspended-slurry reactor 600, in accordance with another embodiment of the present invention. The reactor 600 includes heat exchanges 610, reactor plates 620, and a gasket 630. The reactor 600 also includes feed channels 615, effluent channels 640, porous metal sheets 660, and suspended-slurry sheets or membrane 670. The reactor 600 further includes an inlet 602, an outlet 604, tubes for thermocouples 635, and bolts 690.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:
1. An apparatus for generating a large volume of gas from a liquid stream, comprising:
 a. a first channel through which the liquid stream passes;
 b. a layer of catalyst particles suspended in a solid slurry, through which the liquid stream passes from one side of the catalyst layer to the other, for generating gas from the liquid stream; and
 c. a second channel through which a mixture of converted liquid and generated gas passes, wherein the first and second channels are located on opposite sides of the catalyst layer.
2. The apparatus of claim 1 further comprising a heat exchange channel for heating the liquid stream.
3. The apparatus of claim 1 further comprising a wicking structure located in the second channel for separating the gas generated from the converted liquid.
4. The apparatus of claim 1 wherein the liquid stream is a liquid organic hydrogen carrier and the generated gas is hydrogen.
5. The apparatus of claim 1 wherein the catalyst particles comprise at least one of the following: $Pt/Al_2O_3$ and $Pd/Al_2O_3$.
6. The apparatus of claim 1 wherein the catalyst particles are approximately 2 µm or less.
7. The apparatus of claim 1 wherein the solid slurry consists of catalyst particles held together in a solid-like matrix with a polymer.
8. The apparatus of claim 7 wherein the polymer is Teflon.
9. The apparatus of claim 7 wherein the catalyst particles comprise at least 90% by mass of the solid slurry.

10. The apparatus of claim 7 wherein greater than 50% of the catalyst is accessible relative to 100% catalyst particles.

11. The apparatus of claim 2 further comprising a structural element in the first channel to support the suspended slurry and to improve heat transfer.

12. The apparatus of claim 1 wherein the suspended slurry is less than about 0.5 mm thick.

13. The apparatus of claim 1 wherein the suspended slurry is less than about 0.15 mm thick.

14. The apparatus of claim 1 wherein the suspended slurry is in a sheet with an area to thickness ratio of at least 10 mm.

15. The apparatus of claim 1 wherein the suspended slurry is in a sheet with an area to thickness ratio of at least 1000 mm.

16. The apparatus of claim 1 wherein the suspended slurry is in a sheet with an area to thickness ratio of at least 10,000 mm.

17. An apparatus for generating a large volume of gas from a liquid stream, comprising:

a. a first channel through which the liquid stream passes;

b. a layer of catalyst particles suspended in a solid slurry, through which the liquid stream passes from one side of the catalyst layer to the other, for generating gas from the liquid stream;

c. a second channel through which a mixture of converted liquid and generated gas passes, wherein the first and second channels are located on opposite sides of the catalyst layer;

d. a heat exchange channel for heating the liquid stream; and e. a wicking structure located in the second channel for separating the gas generated from the converted liquid;

wherein the liquid stream is a liquid organic hydrogen carrier and the generated gas is hydrogen, and the solid slurry contains catalyst particles held together in a solid-like matrix with a polymer.

* * * * *